(12) United States Patent
Krause et al.

(10) Patent No.: US 10,933,788 B2
(45) Date of Patent: Mar. 2, 2021

(54) FOLDABLE INSERT

(71) Applicant: LEAR CORPORATION, Southfield, MI (US)

(72) Inventors: Timothy Krause, Southfield, MI (US); Michael D. Losert, Waterford, MI (US); Mark Duso, Southfield, MI (US); Mark Karges, Southfield, MI (US)

(73) Assignee: Lear Corporation, Southfield, MI (US)

( * ) Notice: Subject to any disclaimer, the term of this patent is extended or adjusted under 35 U.S.C. 154(b) by 97 days.

(21) Appl. No.: 15/939,945

(22) Filed: Mar. 29, 2018

(65) Prior Publication Data
US 2019/0299833 A1 Oct. 3, 2019

(51) Int. Cl.
*B60N 3/10* (2006.01)
*B62D 65/14* (2006.01)

(52) U.S. Cl.
CPC ............ *B60N 3/10* (2013.01); *B62D 65/14* (2013.01)

(58) Field of Classification Search
CPC ........ B65D 5/66; B65D 5/0085; B65D 43/16; B65D 43/162; B65D 43/161; B65D 47/08; B65D 47/0838; B65D 47/0842; B60N 3/10; B60N 3/102; B60R 2011/0007; B60R 13/0262; B60R 13/0275
USPC .... 296/97.1, 97.8, 1.07, 1.09; 220/810, 836, 220/837
See application file for complete search history.

(56) References Cited

U.S. PATENT DOCUMENTS

| 5,300,748 | A | * | 4/1994 | Colombo | B65D 11/16 219/734 |
| 5,715,966 | A | * | 2/1998 | Nagano | B32B 3/02 220/837 |
| 5,730,310 | A | * | 3/1998 | Yoshihara | A45C 13/005 16/225 |
| 5,762,852 | A | * | 6/1998 | Hettinga | B29C 45/14336 264/251 |
| 6,033,005 | A | | 3/2000 | Crotty, III | |
| 6,051,186 | A | * | 4/2000 | Bond | A61L 2/26 422/22 |
| 6,439,410 | B1 | * | 8/2002 | Dubach | B65D 47/0809 215/235 |
| 6,572,909 | B1 | * | 6/2003 | Bagwell | B65D 43/162 206/216 |
| 6,612,637 | B1 | * | 9/2003 | Crotty, III | B60J 3/0278 296/97.1 |
| 7,226,113 | B2 | | 6/2007 | Dreier et al. | |
| 7,291,307 | B2 | | 11/2007 | Moran et al. | |
| 8,870,218 | B2 | | 10/2014 | Baumont et al. | |
| 2010/0264684 | A1 | | 10/2010 | Kring et al. | |

* cited by examiner

*Primary Examiner* — Christopher M Koehler
(74) *Attorney, Agent, or Firm* — Brooks Kushman P.C.

(57) ABSTRACT

A foldable insert for a vehicle component includes a first body portion, a second body portion, and a bridge extending from the first body portion to the second body portion. The first body portion includes a first groove disposed adjacent the bridge, and the second body portion includes a second groove disposed adjacent the bridge opposite the first groove.

18 Claims, 4 Drawing Sheets

US 10,933,788 B2

FOLDABLE INSERT

TECHNICAL FIELD

The present disclosure relates to a foldable insert for a vehicle component.

BACKGROUND

An armrest having an insert is disclosed in U.S. Pat. No. 7,226,113 B2.

SUMMARY

In at least one approach, a foldable insert for a vehicle component is provided. The foldable insert may include a first body portion, a second body portion, and a bridge. The first body portion may define a first planar engagement surface, and the second body portion may define a second planar engagement surface. The bridge may extend in a longitudinal direction from the first body portion to the second body portion. The bridge may define a transverse axis that extends perpendicular to the longitudinal direction. The bridge may further define an arcuate lower surface. The first body portion may include a first groove disposed adjacent the bridge and extending parallel to the transverse axis. The second body portion may include a second groove disposed adjacent the bridge opposite the first groove and extending parallel to the transverse axis. The foldable insert may be foldable about the bridge to a configuration in which the second planar engagement surface is disposed in engagement with the first planar engagement surface and the second groove is disposed opposite the first groove.

In at least one approach, a method of assembling a reinforced vehicle component is provided. The method may include providing an insert in a first configuration. The insert may include a first body portion defining an insert receptacle, a first planar engagement surface, a receiving surface disposed between the insert receptacle and the first planar engagement surface, and a first groove disposed adjacent to the first planar engagement surface. The insert may further include a second body portion defining a second planar engagement surface and a second groove adjacent to the second planar engagement surface. The insert may further include a bridge extending from a perimeter edge of the first groove to a perimeter edge of the second groove. The method may include positioning a frame on at least one of the receiving surface and the second planar engagement surface. The method may further include folding the insert about the bridge to a second configuration. In the second configuration, the second planar engagement surface may be disposed in engagement with the first planar engagement surface and the second groove may be disposed opposite the first groove.

In at least one approach, a foldable foam insert for a vehicle component is provided. The foldable foam insert may include a first foam body portion defining a first planar engagement surface, and a second foam body portion defining a second planar engagement surface that is coplanar with the first planar engagement surface. The foldable foam insert may further include a foam bridge that may extend in a longitudinal direction from the first foam body portion to the second foam body portion. The foam bridge may define a transverse axis that may extend perpendicular to the longitudinal direction. The foam bridge may further define an arcuate lower surface. The first foam body portion may include a first groove disposed adjacent the bridge and extending parallel to the transverse axis. The second foam body portion may include a second groove disposed adjacent the bridge opposite the first groove and may extend parallel to the transverse axis. The foldable foam insert may be foldable about the foam bridge to a configuration in which the second planar engagement surface is disposed in engagement with the first planar engagement surface and the second groove is disposed opposite the first groove.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
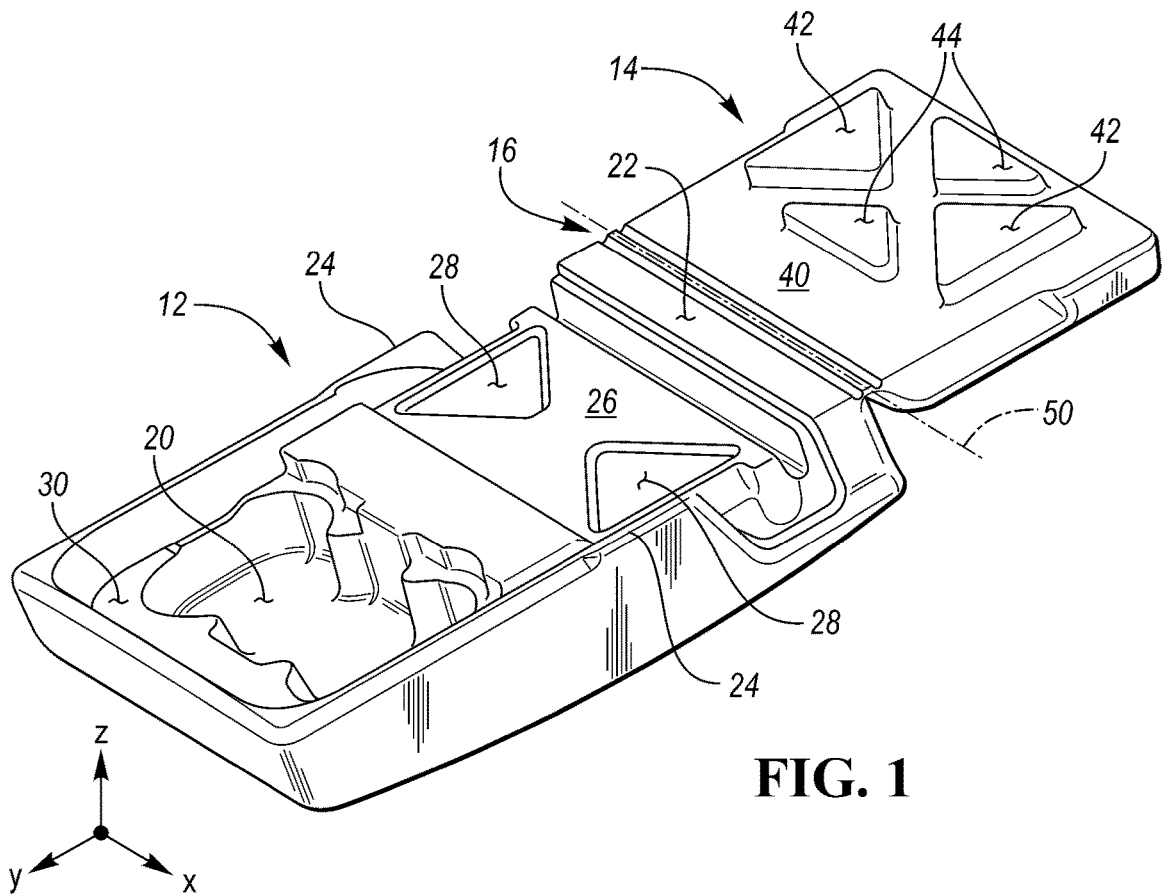
FIG. 1 is a perspective view of a foldable insert in a first configuration.
Figure 2:
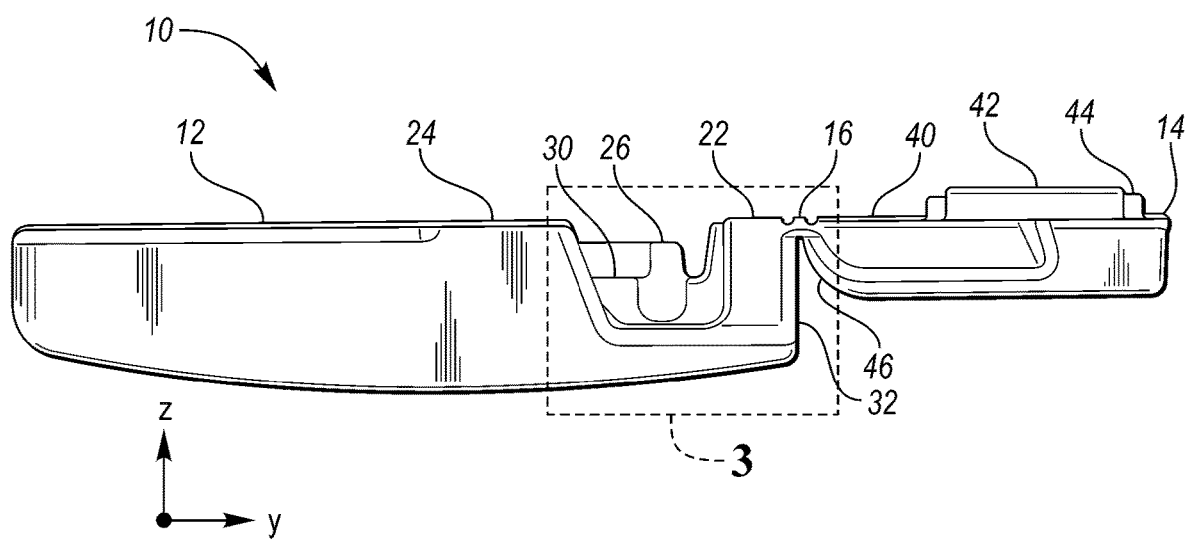
FIG. 2 is a side elevation view of the foldable insert in the first configuration.
Figure 3:
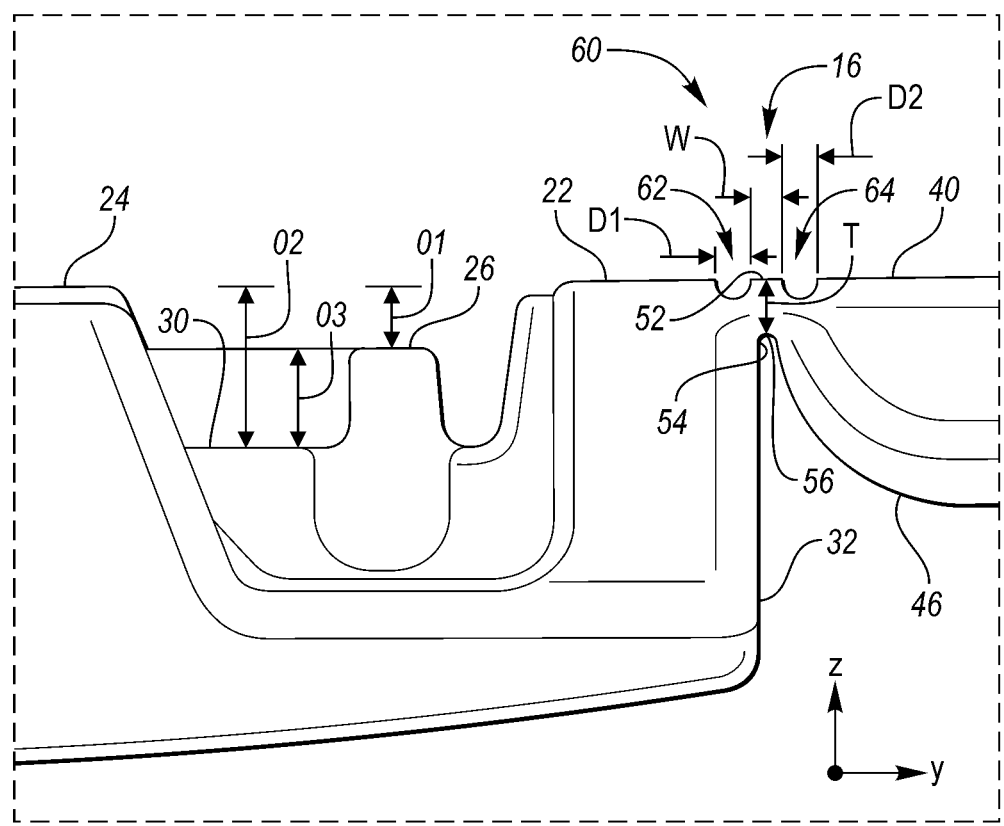
FIG. 3 is an enlarged side view of a portion of the foldable insert in the first configuration.

Referring to FIGS. 1-3, an insert 10 is provided. The insert 10 may be used in conjunction with a trim component that encases the insert 10 to form a vehicle component. The vehicle component may be an armrest, a seat base, a seat back, a headliner, or other suitable vehicle component. Although discussed herein as an "insert" adapted to be encased by a trim component, it is expressly contemplated that the insert 10 may be provided with an encasing component other than a trim component, or may instead be provided without any encasing component.

The insert 10 may be a foam insert, and may be an injection molded foam insert. In at least one approach, the insert may be formed of molded polyurethane. Other suitable materials are expressly contemplated. As discussed in greater detail elsewhere herein, the insert 10 may be a foldable insert, and as such, may be folded from a first configuration to a second configuration.

The insert 10 may include a first body portion that may be referred to as a base portion 12, a second body region that may be referred to as a cover portion 14, and a bridge 16 that extends between the base portion 12 and the cover portion 14.

The base portion 12 may define a recessed region 20. As discussed in greater detail elsewhere herein, the recessed region 20 may be sized and adapted to receive an insert such as a molded cupholder insert.

The base portion 12 may also include a first engagement surface 22. The first engagement surface 22 may be a planar engagement surface. The base portion 12 may also include one or more engagement ridges, such as opposing engagement ridges 24. The engagement ridges 24 may extend to a height (e.g., along the Z axis) such that upper surfaces of the engagement ridges 24 may be coplanar with the first engagement surface 22, as shown in FIGS. 2 and 3.

The base portion 12 may also include a receiving surface 26. The receiving surface 26 may be a planar receiving surface, and may extend between the opposing engagement ridges 24 in a first direction (e.g., along the X axis), and may extend between the recessed region 20 and the first engagement surface 22 in a second direction orthogonal to the first direction (e.g., along the Y axis). The receiving surface 26 may extend at height that is offset from the engagement surface 24, as indicated by "O1" in FIG. 3. Offset O1 may be, for example, at least 2 millimeters, and more particularly, may be in the range of approximately 5 millimeters to approximately 20 millimeters, and more particularly, may be approximately 9 millimeters. In at least one approach, one or more recesses 28 may be formed in (e.g., extend into) the receiving surface 26. The recesses 28 may include triangular recesses or any other suitable shape.

The base portion 12 may also define a frame retainer 30. The frame retainer 30 may be a recessed region that extends from the receiving surface 26 to the recessed region 20. The frame retainer 30 may extend around the recessed region 20 so as to partially or entirely encompass the recessed region 20. At least a portion of the frame retainer 30 may be disposed between individual engagement ridges 24 and the receiving surface 26. The frame retainer 30 may be offset from the engagement surface 22, as indicated by "O2" in FIG. 3. Offset O2 may be, for example, at least 2 millimeters, and more particularly, may be in the range of approximately 10 millimeters to approximately 30 millimeters, and more particularly, may be approximately 20 millimeters. Furthermore, the frame retainer 30 may be offset from the receiving surface 26, as indicated by "O3" in FIG. 3. Offset O3 may be, for example, at least 2 millimeters, and more particularly, may be in the range of approximately 5 millimeters to approximately 20 millimeters, and more particularly, may be approximately 11 millimeters.

The base portion 12 may also define a rear wall 32. In at least one approach, at least a portion of the rear wall 32 defines a planar wall portion.

The cover portion 14 may include a second engagement surface 40. In a first configuration, shown in FIGS. 1-3, the second engagement surface 40 may extend in a plane that may be parallel to the first engagement surface 22 and the receiving surface 26. Furthermore, the second engagement surface 40 may be coplanar with the first engagement surface 22, and may be offset from the receiving surface 26; for example, by a distance that may correspond to offset "O1" in FIG. 3. The second engagement surface 40 may also be offset from the frame retainer 30; for example, by a distance that may correspond to "O2" in FIG. 3.

One or more protrusions may extend from the second engagement surface 40. For example, a first plurality of protrusions 42 and a second plurality of protrusions 44 may extend from the second engagement surface 40. In at least one approach, the first plurality of protrusions 42 may extend to a first height from the second engagement surface 40, and the second plurality of protrusions 44 may extend to a second height from the second engagement surface 40. As shown in FIG. 2, the first plurality of protrusions 42 may extend a greater height from the second engagement surface 40 than the second plurality of protrusions 44 such that the first height is greater than the second height. The cover portion 14 may also define a rear wall 46.

The bridge 16 may extend in a longitudinal direction (e.g., along the Y axis in FIGS. 1-3) from the base portion 12 to the cover portion 14. The bridge 16 may also extend in a transverse direction (e.g., along the X axis in FIG. 1) between the base portion 12 and the cover portion 14. For example, the bridge 16 may extend along an entire width of one or both of the base portion 12 and the cover portion 14. In this way, the bridge 16 may define a transverse axis 50 that extends perpendicular to the longitudinal direction (e.g., along the X axis). As will be appreciated, the transverse axis 50 may be parallel to, or coaxial with, a fold axis about which the cover portion 14 may be folded relative to the base portion 12.

The bridge 16 may define a planar bridge surface 52. In at least one approach, the planar bridge surface 52, the first engagement surface 24, and the second engagement surface 40 are coplanar surfaces. The planar bridge surface 52 may have a width ("W" in FIG. 3); for example, extending in the Y direction. The planar bridge surface 52 may define a plane in which the transverse axis 50 is disposed.

The bridge 16 may further define a lower surface 54 disposed opposite the planar bridge surface 52. The lower surface 54 may extend from a distal end region of the base portion 12 (e.g., rear wall 32) to an opposing distal end of the cover portion 13 (e.g., rear wall 46). In at least one approach, the lower surface 54 is a lower arcuate surface that defines a curvature. The lower arcuate surface may define a crown, which may be considered to be a region or point along the lower arcuate surface. More particularly, the crown may define a central-most point of the lower arcuate surface. The central-most point may define a thickness ("T" in FIG. 3) with the planar bridge surface 52 that may correspond to the minimum thickness of the bridge 16.

Referring to FIG. 3, the insert 10 may define a deformable region 60. The deformable region 60 may include a portion of the base portion 12, a portion of the cover portion 14, and at least a portion of the bridge 16. More particularly, the deformable region 60 may include a first groove 62 disposed within the base portion 12, a second groove 64 disposed within the cover portion 14, and the entire bridge 16. The first groove 62 may extend from the first engagement surface 22 (e.g., into a body of the base portion 12) at a distal end of the base portion 12. The first groove 62 may extend parallel to the transverse axis 50. For example, as shown in FIG. 3, a cross section of the first groove 62 may define a semicircle that may, for example, extend about a central axis. The central axis of the first groove 62 may extend parallel to the transverse axis 50 (e.g., in the X direction of FIG. 1).

The second groove 64 may extend from the second engagement surface 40 (e.g., into a body of the cover portion 14). The second groove 64 may extend parallel to the transverse axis 50. For example, as shown in FIG. 3, a cross section of the second groove 64 may define a semicircle that may, for example, extend about a central axis. The central axis of the second groove 64 may extend parallel to the transverse axis 50 (e.g., in the X direction of FIG. 1).

The planar bridge surface 52 may extend between the first groove 62 and the second groove 64. For example, the planar bridge surface 52 may extend from the first groove 62 to the second groove 64. As used herein, the planar bridge surface 52 may extend from the first groove 62 such that the planar bridge surface 52 is disposed immediately adjacent the first groove 62. Similarly, the planar bridge surface 52 may extend to the second groove 64 such that the planar bridge surface 52 is disposed immediately adjacent the second groove 64. In this way, the planar bridge surface 52 may extend from a perimeter (e.g., a perimeter edge) of the first groove 62 to a perimeter (e.g., a perimeter edge) of the second groove 64.

In at least one approach, one or more features of the deformable region 60 may be provided with corresponding dimensions. As used herein, a first dimension corresponds to a second dimension if the first dimension is equal to the second dimension, or is substantially equal to the second dimension (e.g., less than or equal to a 5% variance). In at least one approach, the first groove 62 may define a first diameter ("D1" in FIG. 3) that corresponds to a second diameter ("D2") of the second groove 64. For example, both the first diameter D1 and the second diameter D2 may be approximately five millimeters.

In at least one approach, the bridge 16 may define a thickness T between the planar bridge surface 52 and the crown 56 of the arcuate lower surface 54 that corresponds to the width W of the planar bridge surface 52. For example, both the thickness T and the width W may be approximately five millimeters.

Figure 4:
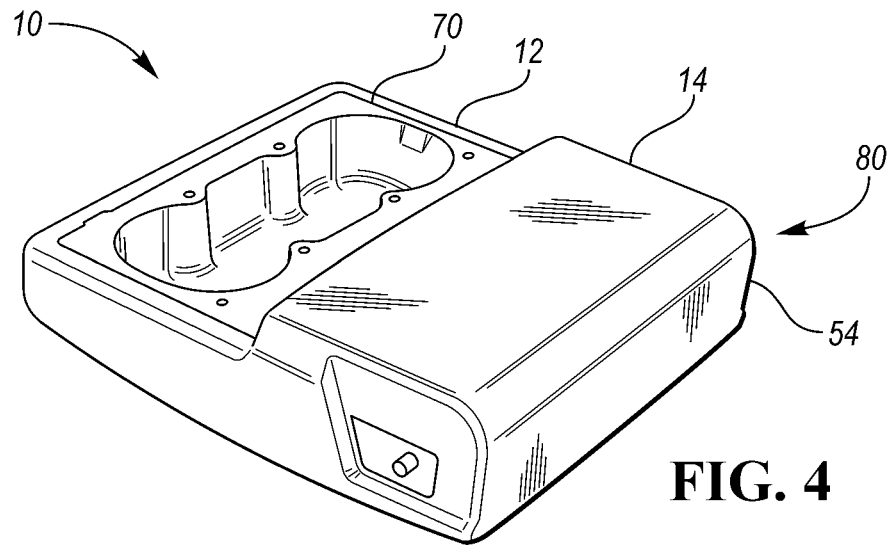
FIG. 4 is a perspective view of the foldable insert in a second configuration.
Figure 5:
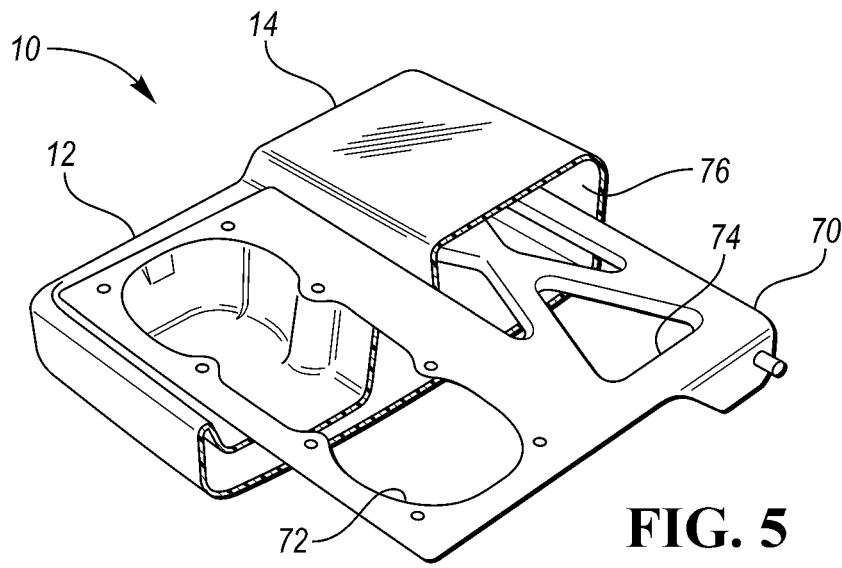
FIG. 5 is a perspective, partially sectioned view of the foldable insert in the second configuration.
Figure 6:
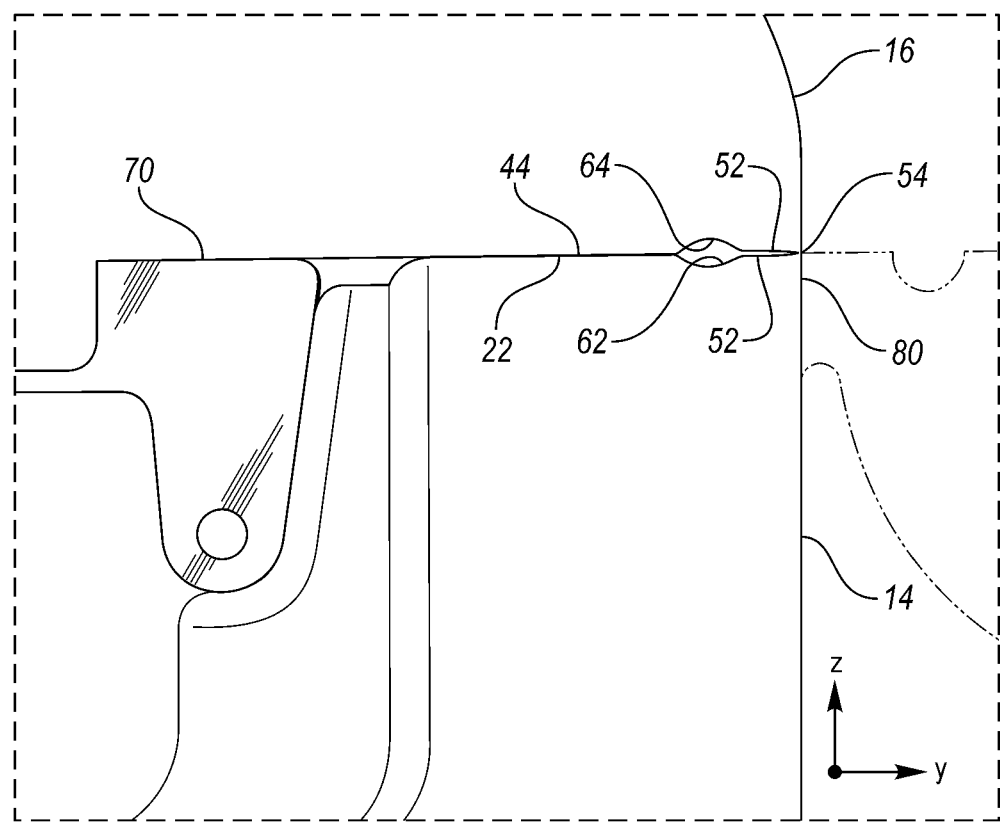
FIG. 6 is an enlarged side view of a portion of the foldable insert in the second configuration.

Referring to FIGS. 4-6, the insert 10 may be adapted to receive a frame 70. The frame 70 may be disposed such that it engages the base portion 12; for example, at the receiving surface 26 and the frame retainer 30. The frame 70 may include one or more apertures. For example, one or more apertures 72 may be disposed in alignment with the recessed region 20. A second set of apertures 74 may be disposed in alignment with the recesses 28 formed in the receiving surface 26. A third set of apertures 76 may be disposed above the receiving surface 26.

As discussed, the insert 10 may be folded from a first configuration (shown in FIGS. 1-3) to a second configuration (shown in FIGS. 4-6). The insert 10 may be folded about the bridge 16. In the second configuration, the second engagement surface 40 may engage the first engagement surface 22, the engagement ridges 24, or both the first engagement surface 22 and the engagement ridges 24. Also in the second configuration, the second groove 64 may interface the first groove 62, as shown in FIG. 6. More particularly, a groove surface of the second groove 64 may be disposed opposite a groove surface of the first groove 62. In at least one approach, the groove surfaces of the first and second grooves 62, 64 may be at least partially spaced apart. For example, at least part of the second groove may not be in direct engagement. In still another approach, groove surfaces of the first and second groove 62, 64 may be disposed in direct engagement.

Also in the second configuration, the first plurality of protrusions 42 may extend through the second set of apertures 72 and into the recesses 28 formed in the receiving surface 26. The second plurality of protrusions 44 may extend through the third set of apertures 76 and into engagement with the receiving surface 26. In this way, the first and second plurality of protrusions 42, 44 of the cover portion 14 may engage side walls of the second and third sets of apertures 72, 74 to provide an interference fit with the frame 70. The interference fit may act to retain the cover portion 14 in the second configuration. For example, the interference fit may sufficiently retain the cover portion 14 in the second configuration such that additional fastening of the cover portion 14 to the base portion 12 (e.g., using mechanical or adhesive fasteners) may not be necessary to retain the cover portion 14 in the second configuration.

In at least one approach, one or more dimensions of the bridge 16 may correspond to one or both of the diameters D1, D2 of the first and second groove 62, 64. For example, the bridge 16 may define a thickness T between the planar bridge surface 52 and the crown 56 of the arcuate lower surface 54 that corresponds to the first diameter D1 of the first groove 62, the second diameter D2 of the second groove 64, or to both the first and second diameters D1, D2 of the first and second groove 62, 64. The thickness T, the first diameter D1, and the second diameter D2 may all be approximately five millimeters.

In still another example, the planar bridge surface 52 may have a width W in the longitudinal direction (e.g., the Y direction) that corresponds to the first diameter D1 of the first groove 62, the second diameter D2 of the second groove 64, or to both the first and second diameters D1, D2 of the first and second groove 62, 64. The width W, the first diameter D1, and the second diameter D2 may all be approximately five millimeters. In at least one approach, W=X, T=X, D1=X, and D2=X (with X being a numeral).

The corresponding dimensions may be selected such that when the insert 10 is folded from the first configuration (shown in FIGS. 1-3) to a second configuration (shown in FIGS. 4 and 5), the insert 10 defines a continuous rear wall surface 80. The rear wall surface 80 may include the rear wall 32 of the base portion 14, the lower surface 54 of the bridge 16, and the rear wall 46 of the cover portion 14. The continuous rear wall surface 80 may be a substantially smooth surface. In this way, the continuous rear wall surface 80 may be free of protrusions, indentations, or other discontinuities. More particularly, as shown in FIG. 6, the base portion 14, the lower surface 54 of the bridge 16, and the rear wall 46 of the cover portion 14 may all be coplanar such that the continuous rear wall surface 80 extends in plane.

Figure 7:
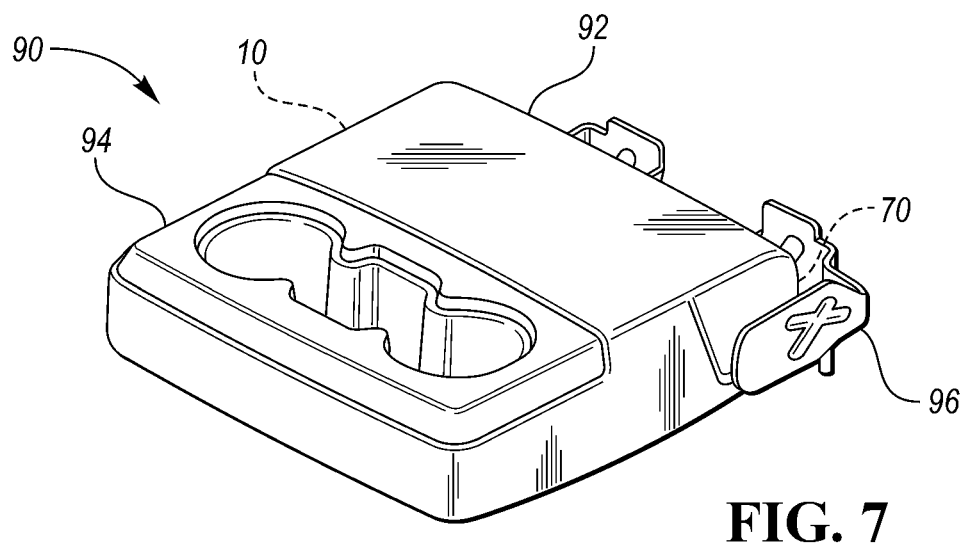
FIG. 7 is a perspective view of an armrest assembly.

Referring now to FIG. 7, an armrest 90 may be provided. The armrest 90 may include the insert 10 and the frame 70, with the insert 10 disposed in the second configuration. The armrest 90 may further include a trim cover 92 that extends over the insert 10 and the frame 70. The armrest 90 may further include a cup holder insert 94 that may be received, for example, in the recessed region 20 of the base portion 14 of the insert 10. The armrest 90 may further include a hinge assembly 96. In this way, when the armrest 90 is secured to a vehicle, the armrest 90 may be rotatable between a first angular position (e.g., a raised orientation) and a second angular orientation (e.g., a lowered orientation).

In at least one approach, a method of assembling a reinforced vehicle component may be provided. The method may include providing a foam insert. The foam insert may be the insert 10 discussed with respect to FIGS. 1-3. The method may include positioning a frame, such as frame 70, on at least one surface of the foam insert (e.g., receiving surface 26). The method may further include folding the foam insert about a bridge from a first configuration to a second configuration. The method may further include encasing at least a portion of the foam insert with a trim cover when the foam insert is in the second configuration. The method may further include inserting a molded cupholder into an insert receptacle of the foam insert. The method may further include securing the reinforced vehicle component to a vehicle such that the reinforced vehicle component is rotatable about a hinge.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A foldable insert for a reinforced vehicle component, the foldable insert comprising:
    a first body portion defining a first engagement surface, a frame retaining surface offset from the first engagement surface for receiving a reinforcing frame, the first body portion having a recess defined along the engagement surface, and a first groove disposed adjacent to the first engagement surface;
    a second body portion defining a second engagement surface and at least a first protrusion protruding from the second engagement surface and a second groove adjacent to the second engagement surface; and
    a bridge extending between the first groove and the second groove;
    wherein the first body portion and second body portion are foldable about the bridge from a first open configuration to a second folded configuration,
    wherein in the second folded configuration, the second engagement surface is disposed in engagement with the first engagement surface and the second groove is disposed opposite the first groove, and where the protrusion is inserted in the recess with an interference fit to retain the second body portion on the first body portion,
    wherein a cavity is defined between the first and second body portions adjacent the frame retaining surfaces in the second folded configuration,
    wherein the first body portion defines an insert receptacle, wherein the frame retaining surface is disposed between the insert receptacle and the first engagement surface.

2. The foldable insert of claim 1 wherein in the first open configuration, the bridge includes an arcuate lower surface and a bridge surface disposed opposite the arcuate lower surface and between the first groove and the second groove.

3. The foldable insert of claim 2 wherein in the first open configuration, the bridge surface, the first engagement surface, and the second engagement surface are coplanar surfaces.

4. The foldable insert of claim 2 wherein in the first open configuration, the bridge defines a thickness between the bridge surface and a crown region of the arcuate lower surface that is generally equal to a diameter of at least one of the first groove and the second groove.

5. The foldable insert of claim 2 wherein in the first open configuration, the bridge surface has a width that is generally equal to a diameter of at least one of the first groove and the second groove.

6. The foldable insert of claim 5 wherein in the first open configuration, the bridge defines a thickness between the bridge surface and a crown region of the arcuate lower surface that is generally equal to the width of the bridge surface.

7. The foldable insert of claim 2 wherein in the first open configuration, a first diameter of the first groove is generally equal to a second diameter of the second groove.

8. The foldable insert of claim 1 wherein the foldable insert is formed of foam.

9. The foldable insert of claim 1 wherein the insert receptacle is adapted to receive a molded cupholder.

10. A reinforced vehicle component having a foldable foam insert, the reinforced vehicle component comprising:
    a first foam body portion defining a first engagement surface;
    a second foam body portion defining a second engagement surface; and
    a foam bridge extending in a longitudinal direction from the first foam body portion to the second foam body portion, the foam bridge defining a transverse axis extending perpendicular to the longitudinal direction,
    wherein the first foam body portion includes a first groove disposed adjacent the bridge and extending parallel to the transverse axis, wherein the second foam body portion includes a second groove disposed adjacent the bridge opposite the first groove and extending parallel to the transverse axis; and
    a reinforcing frame insert positioned along the first or second engagement surface, and
    wherein the foldable foam insert is foldable about the foam bridge to a folded configuration in which the second engagement surface is disposed in engagement with the first engagement surface and the second groove is disposed opposite the first groove, wherein in the folded configuration, the reinforcing frame is encased between the first and second foam body portions,
    wherein one of the first and second body portions includes a protrusion extending from the engagement surface, and the frame has at least one aperture, wherein in the folded configuration, the protrusion extends through the aperture.

11. The reinforced vehicle component of claim 10, wherein the bridge has a thickness less than the first body portion or second body portion, wherein the first body portion and second body portion are foldable about the bridge from a first open configuration to a second folded configuration.

12. The reinforced vehicle component of claim 10, wherein the other of the first and second engagement surfaces has recess, wherein in the folded configuration, the protrusion extends through the aperture and into the recess and is retained with an interference fit.

13. The reinforced vehicle component of claim 10, further comprising a frame retainer surface offset below the engagement surfaces, wherein the frame is positioned along the frame retention surface in an open configuration.

14. A reinforced vehicle component comprising:
a first body portion having a first engagement surface and having at least one protrusion protruding from the first engagement surface,
a second body portion having a second engagement surface with a frame retainer surface offset from the second engagement surface and at least one recess; and
a bridge extending between the first and second body portions and having a thickness less than the first body portion or second body portion, wherein the first body portion and second body portion are foldable about the bridge from a first open configuration to a second folded configuration;
a frame disposed on the frame retainer surface,
wherein in the second folded configuration, the second engagement surface is disposed in engagement with the first engagement surface and the protrusion is disposed in the recess, the frame thereby retained between the first and second body portions,
wherein the frame has at least one aperture, wherein in the folded configuration, the at least one protrusion extends through the aperture.

15. The reinforced vehicle component of claim 14, wherein the at least one protrusion comprises a first protrusion having a first height from the first engagement surface and a second protrusion having a second protrusion height being greater than the first protrusion height.

16. The reinforced vehicle component of claim 14, wherein the recess is formed in the frame retainer surface.

17. The reinforced vehicle component of claim 14, wherein the first body portion has a first groove disposed adjacent the bridge and extending parallel to a transverse axis about which the first and second body portions fold, wherein the second body portion includes a second groove disposed adjacent the bridge opposite the first groove and extending parallel to the transverse axis, wherein in the folded configuration, the first and second grooves are connected.

18. The reinforced vehicle component of claim 17, wherein the first and second grooves have a width generally equal to a width of the bridge.

* * * * *